(12) United States Patent
Kaneko et al.

(10) Patent No.: US 7,948,612 B2
(45) Date of Patent: May 24, 2011

(54) MEASUREMENT SYSTEM

(75) Inventors: Masakatsu Kaneko, Tochigi (JP); Sze Yun Set, Tokyo (JP); Chee Seong Goh, Tokyo (JP); Morisato Namikawa, Tokyo (JP); Yuichi Nagashima, Tokyo (JP); Tomoharu Kotake, Tokyo (JP); Hiroshi Yaguchi, Tokyo (JP)

(73) Assignees: Honda Motor Co., Ltd., Tokyo (JP); Alnair Laboratories Corporation, Tokyo (JP)

( * ) Notice: Subject to any disclaimer, the term of this patent is extended or adjusted under 35 U.S.C. 154(b) by 135 days.

(21) Appl. No.: 12/207,105

(22) Filed: Sep. 9, 2008

(65) Prior Publication Data
US 2009/0066930 A1 Mar. 12, 2009

(30) Foreign Application Priority Data
Sep. 10, 2007 (JP) .................................. 2007-234454

(51) Int. Cl.
*G01C 3/08* (2006.01)
(52) U.S. Cl. ...................................................... 356/5.12
(58) Field of Classification Search ......... 356/3.01–28.5
See application file for complete search history.

(56) References Cited

U.S. PATENT DOCUMENTS

| | | | | |
|---|---|---|---|---|
| 4,900,151 | A | * | 2/1990 | Ulbers .......................... 356/482 |
| 2005/0213076 | A1 | * | 9/2005 | Saegusa .......................... 356/28 |
| 2006/0232790 | A1 | | 10/2006 | Chase et al. |

FOREIGN PATENT DOCUMENTS

| | | |
|---|---|---|
| DE | 3333830 | 4/1985 |
| DE | 3715627 | * 12/1986 |
| DE | 3715627 | 12/1988 |
| DE | 102004038321 | 6/2005 |
| JP | 61-50004 | 3/1986 |
| JP | 62-127685 | 6/1987 |
| JP | 63-9803 | 1/1988 |
| JP | 4-279889 | 10/1992 |
| SU | 1608426 | 5/1988 |
| WO | 2007025363 | 3/2007 |

* cited by examiner

*Primary Examiner* — Thomas H Tarcza
*Assistant Examiner* — Luke D Ratcliffe
(74) *Attorney, Agent, or Firm* — Rankin, Hill & Clark LLP

(57) ABSTRACT

A measurement system 1 for measuring a distance to an object to be measured, includes: a half mirror 10; a measurement light emitting unit 11; a projection unit 12; a light-receiving unit 13; a distance calculation unit 14; and a diffusion lens 16.

1 Claim, 2 Drawing Sheets

US 7,948,612 B2

MEASUREMENT SYSTEM

BACKGROUND OF THE INVENTION

The present invention relates to a measurement system, and relates particularly to a measurement system that performs measurements to determine the form of a work being processed.

Conventionally, measurements made to determine the form of a work being processed are performed using a laser measurement instrument. Specifically, the laser measurement instrument is located where the surface of an entire work being processed can be scanned, and the scanning of the surface is performed using a laser beam. Then, distances between the measurement instrument and measurement points on the surface of the work being processed are calculated to obtain measurements to determine the form of the work being processed.

An example laser measurement instrument has the following arrangement (see, for example, patent document 1): a measurement light emitting unit, for emitting a laser beam that strikes an object to be measured; a light receiving unit, for receiving light reflected by the object to be measured; and a distance calculation unit, for employing the laser beam that is emitted and the reflected light that is received to calculate a distance to the object to be measured.

However, according to the arrangement disclosed in patent document 1, since the optical paths differ for the laser beam emitted by the laser measurement instrument, and the light reflected by the object to be measured and returned to the laser measurement instrument, a complicated arrangement is required for the laser measurement instrument.

To resolve this problem, the following, example laser instrument is proposed.

FIG. 2 is a schematic diagram illustrating the proposed arrangement for a laser measurement instrument 100.

The laser measurement instrument 100 includes: a half mirror 10, also called a semi-transmitting mirror, a measurement light emitting unit 11, a projection unit 12, a light receiving unit 13 and a distance calculation unit 14, and a case 15 in which these components are stored.

As light for performing measurements, the measurement light emitting unit 11 emits a laser beam that passes through the half mirror 10.

The projection unit 12 is, for example, a lens for guiding the laser beam, which is emitted by the measurement light emitting unit 11 and passes through the half mirror 10, to an object being measured, and for guiding to the half mirror 10 the laser beam that is reflected from the object to be measured.

The light-receiving unit 13 receives, from the object to be measured, the reflected laser beam, which reaches the half mirror 10 through the projection unit 12 and is reflected on the half mirror 10.

The distance calculation unit 14 employs the timing for a period, extending from the time the laser beam is first emitted by the measurement light emitting unit 11 until the reflected light, from the object to be measured, is received by the light receiving unit 13, to calculate the distance from the laser measurement instrument 100 to the object to be measured.

According to the laser measurement instrument 100, and in consonance with the solid lines shown in FIG. 2, when the measurement light emitting unit 11 emits the laser beam directed toward the half mirror 10, the laser beam passes through the half mirror 10 and the projection unit 12 and impinges on the object to be measured. Thereafter, the laser beam reflected by the object to be measured is transmitted, through the projection unit 12 again, and returned to the half mirror 10 and is reflected there, and the reflected light is received by the light-receiving unit 13. Then, the distance calculation unit 14 measures the time required for the period extending from the emission of the laser beam to the reception of the reflected laser beam, and from this, obtains the distance from the laser measurement instrument to the object to be measured.

[Patent Document 1] JP-A-62-127685

When the measurement light emitting unit 11 emits a laser beam directed towards the half mirror 10, nearly all the light passes through the half mirror 10 and continues on to the projection unit 12; however, as indicated by a broken line in FIG. 2, not all the light passes through the half mirror 10, part is reflected and follows a path towards an inner wall of the case 15. At the inner wall of the case 15, the laser beam reflected on the half mirror 10 is again reflected and is returned to and passes through the half mirror 10, and reaches the light-receiving unit 13.

Therefore, since the light-receiving unit 13 receives both laser beam reflected by an object to be measured and laser beam reflected by the inner wall of the case 15, the light reflected by the inner wall of the case 15 becomes noise, and this adversely affects the accuracy of a result obtained by the distance calculation unit 14. As a result, an error occurs in the measurement of the distance from the laser measurement instrument 100 to the object to be measured.

SUMMARY OF THE INVENTION

One objective of the present invention is to provide a measurement system for which the distance measurement accuracy is improved.

According to the present invention, there is provided a measurement system (e.g., a measurement system 1, to be described later) for measuring a distance to an object to be measured, including:

a half mirror (e.g., a half mirror 10, to be described later);

a measurement light emitting unit (e.g., a measurement light emitting unit 11, to be described later) for emitting measurement light to the half mirror;

a projection unit (e.g., a projection unit 12, to be described later), for guiding, to an object to be measured, measurement light that is emitted by the measurement light emitting unit and passes through the half mirror, and for guiding, to the half mirror, measurement light that is reflected by the object to be measured;

a light-receiving unit (e.g., a light-receiving unit 13, to be described later) for receiving measurement light that is reflected by the object to be measured, passes through the projection unit to the half mirror and is reflected by the half mirror;

a distance calculation unit (e.g., a distance calculation unit 14, to be described later), for calculating a distance to the object to be measured, based on the measurement light emitted by the measurement light emitting unit and the measurement light received by the light-receiving unit; and an optical path changing unit (e.g., a diffusion lens 16, to be described later) for changing an optical path for any measurement light that is emitted by the measurement light emitting unit and is reflected at the half mirror rather than passing through.

According to the present invention, since the optical path changing unit is additionally included, for any part of the measurement light, emitted by the measurement light emitting unit, that is reflected at the half mirror rather than passed through, the optical path of the reflected light is changed by the optical path changing unit. Therefore, the measurement light reflected at the half mirror can be prevented from returning to the half mirror and continuing on to the light-receiving unit. As a result, noise at the light-receiving unit can be reduced and distance measurement accuracy can be improved.

According to the present invention, since the optical path changing unit is additionally included, for any part of the measurement light, emitted by the measurement light emitting unit, that is reflected at the half mirror rather than passed through, the optical path of the reflected light is changed by the optical path changing unit. Therefore, the measurement light reflected at the half mirror can be prevented from returning to the half mirror and continuing on to the light-receiving unit. As a result, noise at the light-receiving unit can be reduced and distance measurement accuracy can be improved.

DETAILED DESCRIPTION OF THE PREFERRED EMBODIMENTS

One embodiment of the present invention will now be described while referring to a drawing.

Figure 1:
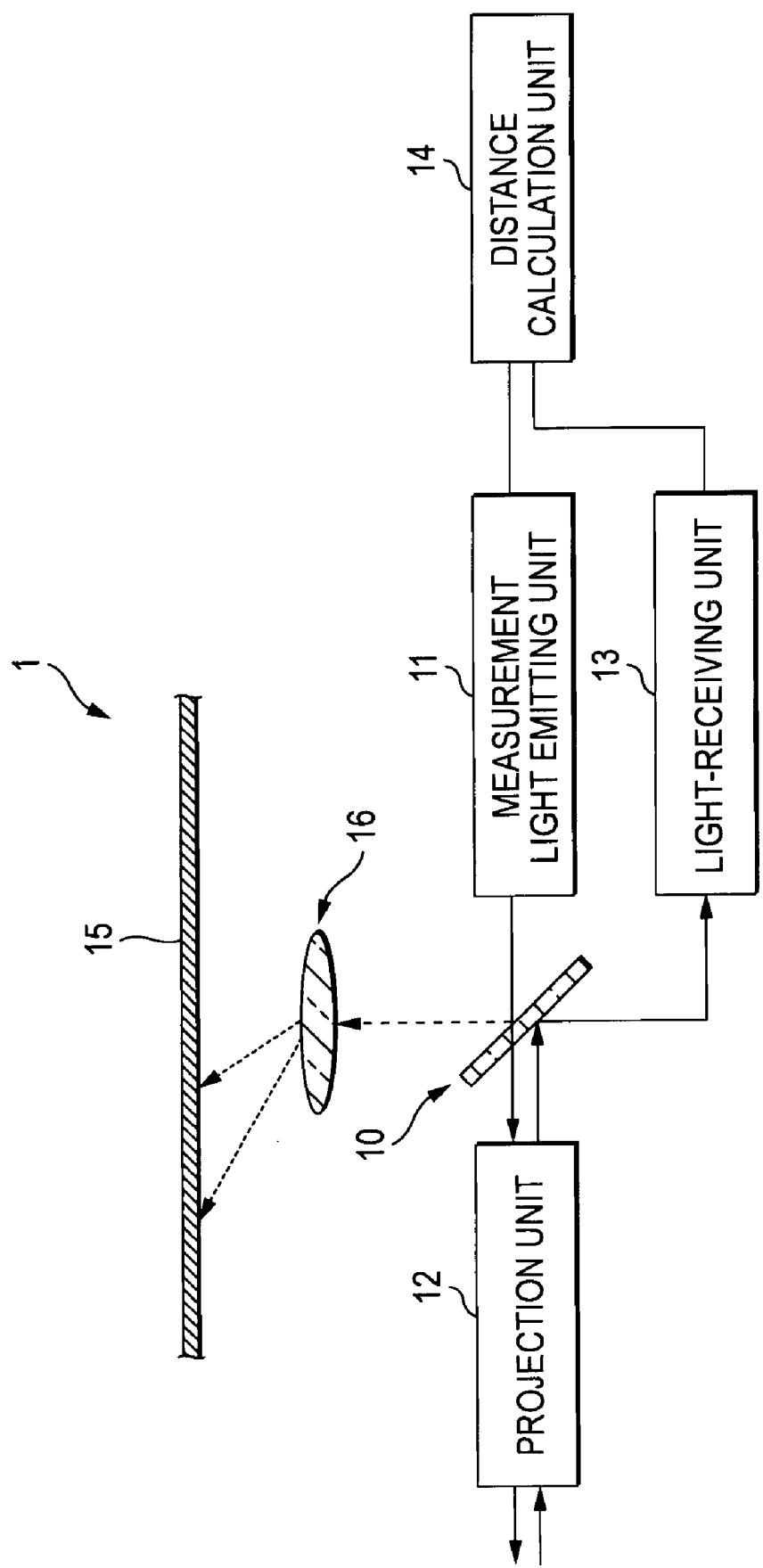
FIG. 1 is a schematic diagram illustrating the arrangement of a measurement system according to one embodiment of the present invention.
Figure 2:
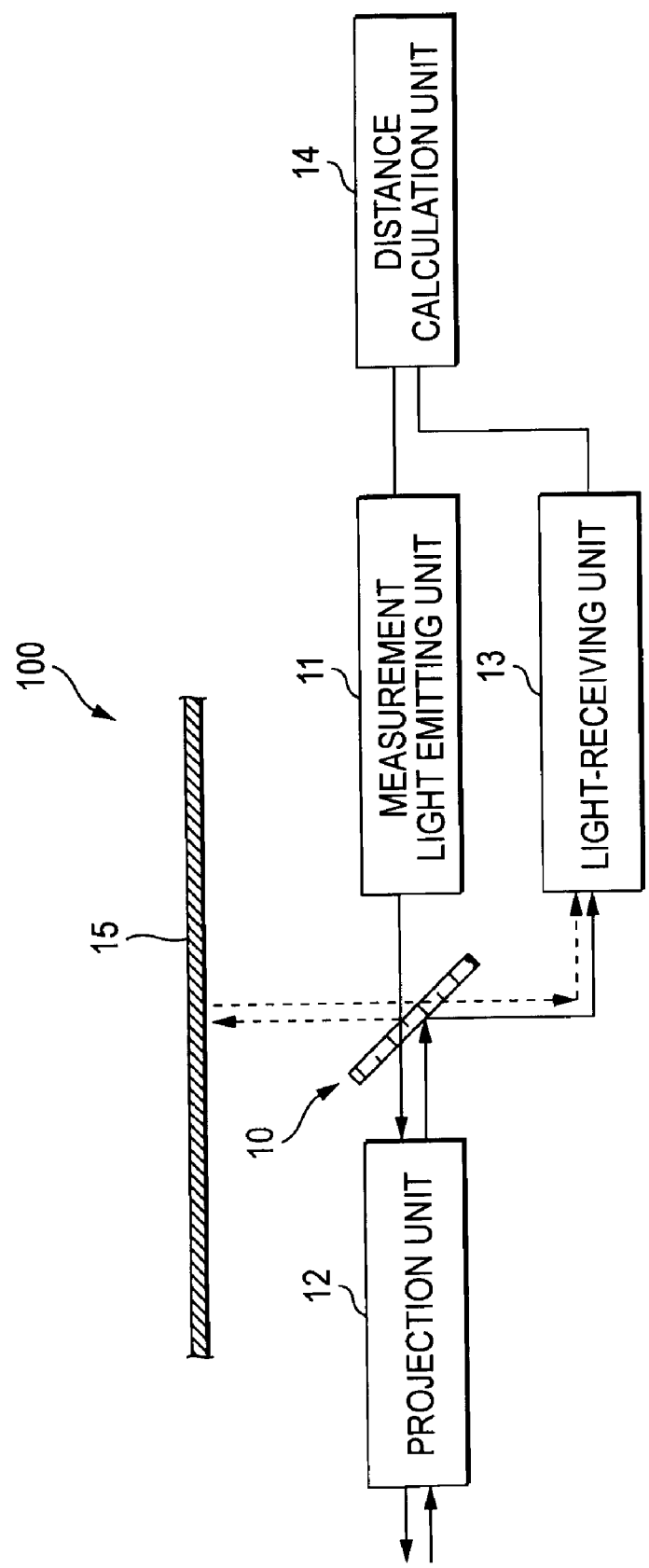
FIG. 2 is a schematic diagram of the arrangement of a conventional measurement system.

FIG. 1 is a schematic diagram illustrating the arrangement of a measurement system 1 according to the present invention.

The measurement system 1 differs from a conventional laser measurement instrument 100 only in that a diffusion lens 16 is additionally disposed as an optical path changing unit. The remainder of the arrangement is the same as that of the laser measurement instrument 100.

The diffusion lens 16 changes the optical path of light that is emitted by a measurement light emitting unit 11 and is reflected by a half mirror 10. Specifically, as indicated by a broken line in FIG. 1, the diffusion lens 16 diffuses light that is emitted by the measurement light emitting unit 11 and is reflected by the half mirror 10.

According to this embodiment, the following effects are obtained.

(1) Even when laser beam emitted by the measurement light emitting unit 11 does not pass through the half mirror 10 but is reflected at the half mirror 10, the diffusion lens 16 prepared for this embodiment diffuses the optical path of the reflected laser beam. Therefore, the laser beam reflected at the half mirror 10 can be prevented from returning to the half mirror 10 and continuing on to a light-receiving unit 13. As a result, noise at the light-receiving unit 13 can be reduced, and the distance measurement accuracy can be improved.

(2) Since only the diffusion lens 16 is additionally required, a simple arrangement can be provided for the measurement system 1.

The present invention is not limited to this embodiment, and modifications and improvements may be provided that fall within the scope of the objective of the invention.

For example, instead of the diffusion lens 16 employed for this embodiment, a frosted glass or a mirror may be arranged as an optical path changing unit, or concave and convex portions may be formed in the surfaces of the inner walls of a case 15.

What is claimed is:

1. A measurement system for measuring a distance to an object to be measured, comprising:
   a half mirror;
   a measurement light emitting unit for emitting measurement light to the half mirror;
   a projection unit, for guiding, to an object to be measured, measurement light that is emitted by the measurement light emitting unit and passes through the half mirror, and for guiding, to the half mirror, measurement light that is reflected by the object to be measured;
   a light-receiving unit for receiving measurement light that is reflected by the object to be measured, passes through the projection unit to the half mirror and is reflected by the half mirror;
   a distance calculation unit, for calculating a distance to the object to be measured, based on the measurement light emitted by the measurement light emitting unit and the measurement light received by the light-receiving unit;
   an optical path changing unit for changing an optical path for any measurement light that is emitted by the measurement light emitting unit and is reflected at the half mirror rather than passing through; and
   a case, wherein the optical path changing unit is concave and convex portions formed in surfaces of inner walls of the case.

* * * * *